United States Patent
Handlin, Jr. et al.

(10) Patent No.: US 7,166,672 B2
(45) Date of Patent: *Jan. 23, 2007

(54) GELS FROM SILANE-COUPLED BLOCK COPOLYMERS

(75) Inventors: Dale Lee Handlin, Jr., Houston, TX (US); Carl Lesley Willis, Houston, TX (US); David John St. Clair, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/453,998

(22) Filed: Jun. 4, 2003

(65) Prior Publication Data

US 2003/0225210 A1    Dec. 4, 2003

Related U.S. Application Data

(60) Provisional application No. 60/385,663, filed on Jun. 4, 2002.

(51) Int. Cl.
*C08L 53/00* (2006.01)

(52) U.S. Cl. .......................... 525/89; 525/98
(58) Field of Classification Search ............ 525/89, 525/98
See application file for complete search history.

(56) References Cited

U.S. PATENT DOCUMENTS

| | | | |
|---|---|---|---|
| 3,149,182 A | 9/1964 | Porter | |
| 3,239,478 A | 3/1966 | Harlan | |
| 3,244,664 A | 4/1966 | Zelinski et al. | |
| 3,281,383 A | 10/1966 | Zelinski et al. | |
| 3,494,942 A | 2/1970 | Mild et al. | |
| RE27,145 E | 6/1971 | Jones | |
| 3,594,452 A | 7/1971 | De La Mare et al. | |
| 3,595,942 A | 7/1971 | Wald et al. | |
| 3,634,594 A | 1/1972 | Hiyama | |
| 3,670,054 A | 6/1972 | De La Mare et al. | |
| 3,692,874 A | 9/1972 | Farrar et al. | |
| 3,700,633 A | 10/1972 | Wald et al. | |
| 3,766,301 A | 10/1973 | De La Mare et al. | |
| 3,880,954 A | 4/1975 | Kahle et al. | |
| 3,985,830 A | 10/1976 | Fetters et al. | |
| 4,076,915 A | 2/1978 | Trepka | |
| 4,104,326 A | 8/1978 | Fodor | |
| 4,104,332 A | 8/1978 | Zelinski | |
| 4,185,042 A | 1/1980 | Verkouw | |
| 4,379,891 A | 4/1983 | Haynes | |
| 4,408,017 A | 10/1983 | Martin | |
| 5,075,377 A | 12/1991 | Kawabuchi et al. | |
| 5,266,649 A | 11/1993 | Balas et al. | |
| 5,272,214 A | 12/1993 | Custro et al. | |
| 5,334,646 A | 8/1994 | Chen | |
| 5,420,203 A | 5/1995 | Dillman et al. | |
| 5,532,319 A | 7/1996 | Asahara et al. | |
| 5,777,043 A | 7/1998 | Shafer et al. | |
| 5,879,694 A | 3/1999 | Morrison et al. | |
| 5,948,527 A * | 9/1999 | Gerard et al. ......... | 428/355 BL |
| 6,723,686 B1 | 4/2004 | Calle et al. | |
| 2003/0225209 A1 * | 12/2003 | Handlin et al. ............... | 525/88 |
| 2003/0232928 A1 * | 12/2003 | Atwood et al. ............. | 525/315 |

FOREIGN PATENT DOCUMENTS

| | | |
|---|---|---|
| CN | 1073950 | 7/1993 |
| CN | 1241582 | 1/2000 |
| EP | 0 404 185 A2 | 6/1990 |
| EP | 0 541 180 A2 | 5/1992 |
| EP | 0 669 350 A1 | 2/1995 |
| EP | 0 745 635 A1 | 5/1996 |
| EP | 1 233 028 A1 | 9/2000 |
| EP | 1 233 028 A1 | 8/2002 |
| JP | 06-279744 | 10/1994 |
| JP | 07-238207 | 9/1995 |
| JP | 2001310988 | 11/2001 |
| WO | 92/20725 | 11/1992 |

\* cited by examiner

*Primary Examiner*—Jeffrey Mullis
(74) *Attorney, Agent, or Firm*—Donna Blalock Holguin

(57) ABSTRACT

The present invention relates to gels prepared from novel anionic block copolymers of mono alkenyl arenas and conjugated dienes, and to blends of such block copolymers with such polymers. The block copolymers are selectively hydrogenated and have A polymer blocks and B polymer blocks wherein A represents a polymer block of a mono alkenyl arene and B represents a polymer block of a conjugated diene. The block copolymer may be combined with tackifying resins, oils and other components to form the gel of the present invention.

23 Claims, No Drawings

GELS FROM SILANE-COUPLED BLOCK COPOLYMERS

CROSS-REFERENCE TO RELATED APPLICATIONS

The present application claims priority from co-pending, commonly assigned U.S. Provisional Patent Application Ser. No. 60/385,663, filed Jun. 4, 2002, entitled Process for Preparing Block Copolymer and Resulting Composition (W0002 prov.). The present application relates to and was filed concurrently with W0002A conv., U.S. patent application Ser. No. 10/454,237.

BACKGROUND OF THE INVENTION

1. Field of the Invention

This invention relates to gels prepared from novel anionic block copolymers of mono alkenyl arenes and conjugated dienes.

2. Background of the Art

The preparation of block copolymers of mono alkenyl arenes and conjugated dienes is well known. One of the first patents on linear ABA block copolymers made with styrene and butadiene is U.S. Pat. No. 3,149,182. These polymers in turn could be hydrogenated to form more stable block copolymers, such as those described in U.S. Pat. No. 3,595,942 and U.S. Re. Pat. No. 27,145. Such polymers are broadly termed Styrenic Block Copolymers or SBC's.

SBC's have a long history of use as adhesives, sealants and gels. A recent example of such a gel can be found in U.S. Pat. No. 5,879,694. With the increased use of oil gels, the need for improved properties (expressed in terms of higher tensile strength and higher elongation) exist. Such gels may also be used, for example, as a water proofing encapsulant/sealant for electronics and in wire and cable applications. Many gels have deficiencies in their properties, such as resistance to oil bleed-out. Accordingly, it would be helpful to have gels which when molded have a smoother surface appearance since gels are often sold as consumer products without covers for example as shoe inserts.

Now a novel anionic block copolymer based on mono alkenyl arene end blocks and conjugated diene mid blocks and having a predominately linear structure prepared with an alkoxy silane coupling agent has been discovered and is described in copending, commonly assigned U.S. patent application Ser. No. 60/385,663, entitled "Process for Preparing Block Copolymer and Resulting Composition". Methods for making such polymers are described in detail in the above-mentioned patent application. Patentees have found that these new polymers will allow the preparation of improved oil gels. In particular, the gels have improved molding appearance with equivalent mechanical properties resulting in improved oil gels.

SUMMARY OF THE INVENTION

In one aspect of the present invention we have discovered a novel oil gel composition comprising 100 parts by weight of at least one predominately linear, hydrogenated block copolymer composition and 300 to about 2000 parts by weight of an extender oil. The hydrogenated block copolymer composition has A polymer blocks and B polymer blocks wherein prior to hydrogenation it has the structure comprising: a. a linear diblock copolymer (I) having a number average molecular weight of 25,000 to 200,000 represented by the general formula A-B; b. a di-branched block copolymer (II) having a number average molecular weight of 50,000 to 400,000 represented by the general formula (A-B); c. a tri-branched block copolymer (III) having a number average molecular weight of 75,000 to 600,000 represented by the general formula $(A-B)_3X$; and d. a tetra-branched block copolymer (IV) having a number average molecular weight of 100,000 to 800,000 represented by the general formula $(A-B)_4X$; where: i) A represents a polymer block of a mono alkenyl arene; ii) B represents a polymer block of a conjugated diene; iii) X represents the residue of an alkoxy silane coupling agent; and iv) the relative amounts of copolymers I, II, III and IV are 2 to 10 weight percent I, 40 to 95 weight percent II, 0 to 60 weight percent III and 0 to 5 weight percent IV, where the total of I, II, III and IV equals 100 weight percent. The alkoxy silane coupling agent has the formula $R_x$—Si—$(OR')_y$, where x is 0 or 1, x+y=4, and R and R' are the same or different, R is selected from aryl hydrocarbon radicals, linear alkyl hydrocarbon radicals and branched alkyl hydrocarbon radicals, and R' is selected from linear and branched alkyl hydrocarbon radicals. Preferably the alkyl hydrocarbon radicals have 1 to 12 carbon atoms. Also included are analogous polymers having the structure $(C-D-E)_nX$, where C represents a polymer block of a hydrogenated conjugated diene, D represents a polymer block of a mono alkenyl arene, and E represents a polymer block of a hydrogenated conjugated diene.

The gels of the present invention are used, for example, as a water proofing encapsulant/sealant for electronics and in wire and cable applications, shoe inserts, toys, novelty items, cushions, rests and damping applications.

DETAILED DESCRIPTION OF THE PREFERRED EMBODIMENTS

The key component of the present invention is the novel block copolymer composition. The process for making such a block copolymer is described and claimed in the 60/385,663 provisional patent application and the conventional U.S. patent application claiming priority from the '663 application, filed concurrently with this application.

Starting materials for preparing the novel copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

A key aspect of the present invention is the coupling agent, used to prepare the novel polymers. As stated above, the coupling agent used in the present invention is an alkoxy silane of the general formula $R_x$—Si—$(OR')_y$, where x is 0 or 1, x+y=4, R and R' are the same or different, R is selected from aryl, linear alkyl and branched alkyl hydrocarbon radicals, and R' is selected from linear and branched alkyl hydrocarbon radicals. The aryl radicals preferably have from 6 to 12 carbon atoms. The alkyl radicals preferably have 1 to 12 carbon atoms, more preferably from 1 to 4 carbon atoms. Preferred tetra alkoxy silanes are tetramethoxy silane ("TMSi"), tetraethoxy silane ("TESi"), tetrabutoxy silane ("TBSi"), and tetrakis(2-ethylhexyloxy)silane ("TEHSi"). Preferred trialkoxy silanes are methyl trimethoxy silane ("MTMS"), methyl triethoxy silane ("MTES"), isobutyl trimethoxy silane ("IBTMO") and phenyl trimethoxy silane ("PhTMO"). Of these the more preferred are tetraethoxy silane and methyl trimethoxy silane.

It is also important to control the molecular weight of the various blocks. For each A block the desired block weights are 3,000 to about 60,000, preferably about 5,000 to about 50,000. For each B block the desired block weights are about 20,000 to about 200,000, preferably about 20,000 to about 150,000. Regarding the CDE block copolymer composition, for each D block the desired block weights are 3,000 to about 60,000, preferably about 5,000 to about 50,000. For each E block the desired block weights are about 20,000 to about 200,000, preferably about 20,000 to about 150,000. For each C block the desired block weights are about 1,000 to about 25,000, preferably about 3,000 to about 15,000. These molecular weights are most accurately determined by light scattering measurements, and are expressed as number average molecular weights.

The relative amounts of the tetra-branched (IV), tri-branched (III), di-branched (II) and linear diblock (or linear triblock) (I)species are: 0 to 5 weight percent tetra-branched IV, 0 to 60 weight percent tri-branched III, 40 to 95 weight percent di-branched II and 2 to 10 weight percent linear diblock (or linear triblock) I. Preferred amounts are: 0 to 5 weight percent IV, 10 to 40 weight percent III, 50 to 95 weight percent II and 4 to 8 weight percent I.

The block copolymer composition has a Coupling Efficiency ("CE") of about 90 to 98 weight percent, preferably about 92 to about 98 weight percent. Coupling Efficiency is defined as the proportion of polymer chain ends which were living, P—Li, at the time the coupling agent was added that are linked via the residue of the coupling agent at the completion of the coupling reaction. In practice, Gel Permeation Chromatography (GPC) data is used to calculate the coupling efficiency for a polymer product. The sum of the areas under the GPC curve for all of the coupled species (II+III+IV) is divided by the sum of the areas under the GPC curve for all of the coupled moieties plus the area under the curve for the starting, uncoupled polymer species (I+II+III+IV). This ratio is multiplied by 100 to convert the coupling efficiency to a percentage value.

The percentage of A blocks in the block copolymer composition is desired to be about 5 to about 50 weight percent, preferably about 15 to about 40 weight percent.

Another important aspect of the present invention is to control the microstructure or vinyl content of the conjugated diene in the B block (or C block and E block. The term "vinyl content" refers to a conjugated diene which is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 10 to about 80 mol percent of the condensed butadiene units in the copolymer block have 1,2 vinyl configuration as determined by proton NMR analysis, preferably about 25 to about 80 mol percent of the condensed butadiene units should have 1,2-vinyl configuration. Below 25% 1,2 vinyl the polymer becomes too crystalline resulting in more oil bleed-out in the gel. Above 80% 1,2 vinyl the polymer becomes inefficient at creating a gel so that more polymer must be used. When referring to the use of isoprene as the conjugated diene, it is preferred that about 5 to about 80 mol percent of the condensed isoprene units in the copolymer block have 3,4 vinyl configuration. In one embodiment of the triblock copolymer C-D-E, the amount of 1,2 configuration in the block C is 5 to 45% and the amount of 1.2 configuration in the block E is 25 to 80%. Vinyl content is effectively controlled by varying the relative amount of the microstructure modifying agent in the solvent mixture. Such materials include ethers such as diethyl ether (DEE) or for higher vinyl contents, diethoxy propane (DEP). Suitable ratios of modifying agent to lithium are disclosed and taught in US Pat. Re 27,145, which disclosure is incorporated by reference.

The block copolymer is selectively hydrogenated. Hydrogenation can be carried out via any of the several hydrogenation or selective hydrogenation processes known in the prior art. For example, such hydrogenation has been accomplished using methods such as those taught in, for example, U.S. Pat. Nos. 3,494,942; 3,634,594; 3,670,054; 3,700,633; and Re. 27,145. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

One of the components used in the gels of the present invention is a polymer extending oil or plasticizer. Especially preferred are the types of oils that are compatible with the elastomeric segment of the block copolymer. While oils of higher aromatics content are satisfactory, those petroleum-based white oils having low volatility and less than 50% aromatic content are preferred. Such oils include both paraffinic and naphthenic oils. The oils should additionally have low volatility, preferably having an initial boiling point above about 500° F.

Examples of alternative plasticizers which may be used in the present invention are oligomers of randomly or sequentially polymerized styrene and conjugated diene, oligomers of conjugated diene, such as butadiene or isoprene, liquid polybutene-1, and ethylene-propylene-diene rubber, all having a number average molecular weight in the range from 300 to 35,000, preferable less than about 25,000 mol weight.

The amount of oil or plasticizer employed varies from about 300 to about 2000 parts by weight per hundred parts by weight rubber, or block copolymer, preferably about 400 to about 1000 parts by weight.

Various types of fillers and pigments can be included in the gel formulations to color the gel, increase stiffness and reduce cost. Suitable fillers include calcium carbonate, clay, talc, silica, zinc oxide, titanium dioxide and the like. The amount of filler usually is in the range of 0 to 30% weight based on the polymer portion of the formulation, depending on the type of filler used and the application for which the gel is intended. An especially preferred filler is silica.

The compositions of the present invention may be modified further with the addition of other polymers in particular polyolefins such an polyethylenes and polypropylenes, reinforcements, antioxidants, stabilizers, fire retardants, anti blocking agents, lubricants and other rubber and plastic compounding ingredients without departing from the scope of this invention. Such components are disclosed in various patents including U.S. Pat. No. 3,239,478; and U.S. Pat. No. 5,777,043, the disclosures of which are incorporated by reference.

Regarding the relative amounts of the various ingredients, this will depend in part upon the particular end use and on the particular block copolymer that is selected for the particular end use. Table A below shows some notional compositions that are included in the present invention. The block copolymer and oil amounts are expressed in parts by weight. If polyethylene or filler are used, they may be used at levels shown as a percent by weight of the polymer component.

TABLE A

Applications, Compositions and Ranges

| Application | Ingredients | Composition, |
|---|---|---|
| Oil gel | Block Copolymer | 100 ppw |
|  | Oil | 300 to 2000 ppw |
|  | Polyethylene | 0 to 80 wt % |
|  | Fillers | 0 to 30 wt % |

The oil gels or gelatinous elastomer compositions of the present invention are useful in a number of applications, including low frequency vibration applications, such as viscoelastic layers in constrained-layer damping of mechanical structures and goods, as viscoelastic layers useful for isolation of acoustical and mechanical noise, as antivibration elastic support for transporting shock sensitive loads, etc. The compositions are also useful as molded shape articles for use in medical and sport health care, such use including therapeutic hand exercising grips, crutch cushions, cervical pillows, bed wedge pillows, leg rest, neck cushion, mattress, bed pads, elbow padding, wrist rests for computers, wheelchair cushions, soft toys and the like. See, for example, U.S. Pat. No. 5,334,646.

EXAMPLES

The following examples are provided to illustrate the present invention. The examples are not intended to limit the scope of the present invention and they should not be so interpreted. Amounts are in weight parts or weight percentages unless otherwise indicated. The test methods used in the examples are American Society for Testing Materials (ASTM) test methods, and the following specific method was used:

| Melt Viscosity | ASTM D-3236 |
|---|---|
| Ring & Ball Softening Point | ASTM D-36 |
| Tensile Properties | ASTM D-412 |

Example 1

The block copolymers of the present invention were prepared according to the process disclosed in copending patent application Ser. No. 60/385,663 referenced above, including its continuing application filed concurrently. The polymers were selectively hydrogenated block copolymers where the A blocks were polystyrene blocks and the B block prior to hydrogenation was polybutadiene block. The polymers are shown in Table 1 below.

TABLE 1

Results For S-Bd-Li Coupling Using Tetramethoxysilane

| | Block Molecular Weight | | Si/Li | CE | Vinyl | Arm Distribution % | | | |
|---|---|---|---|---|---|---|---|---|---|
| Expt. | Step I | Step II | (mol/mol) | (%) | (%) | 1 | 2 | 3 | 4 |
| 1 | 28.3 | 59.0 | 0.45 | 95.2 | 38 | 5 | 46 | 49 | t |
| 2 | 28.2 | 61.2 | 0.45 | 95.9 | 38 | 4 | 51 | 43 | 2 |
| 3 | 28.2 | 64.1 | 0.45 | 93.2 | 38 | 7 | 45 | 46 | 2 |

"Block Molecular Weight" values are in thousands, "Si/Li" is the ratio of tetramethoxysilane coupling agent to s-BuLi initiator, "CE" is coupling efficiency, Vinyl refers to the 1,2-content of the butadiene portion of the polymer, 1 Arm is uncoupled diblock, 2 Arm is the linear triblock copolymer, 3 and 4 Arm polymers are radial in structure, and t stands for a trace.

For all polymerizations, half of the butadiene in Step II is added in batch with the remainder being added via a programmed addition. All polymerizations are at 14% solids. The coupling agent is added at 6 half-lives into Step II.

Example 2

The average mechanical properties of oiled compounds prepared from the polymer hydrogenated in the presence of methanol (CE=95.7% after hydrogenation) are compared to those of the same compounds, but prepared with an S-EB-S sequentially polymerized triblock copolymer of comparable molecular weight (designated CP-1), in Table 2 below. The polymers mixed with 200, 300 and 500 phr oil at 100° C. in a Brabender mixing head. Plaques were compression molded for testing. The properties of the compounds made with the coupled polymer of the present invention are quite comparable to those of the compounds made with the sequential triblock. The appearance of the polymer #1 gels was smoother than the comparative polymer C1.

TABLE 2

Average Mechanical Properties of Oiled Compounds Prepared From the Polymer Hydrogenated In The Presence Of Methanol

| polymer | phr oil | Tensile Strength (PSI) | Elongation (%) | 100% Modulus (PSI) | 500% Modulus (PSI) | 1000% Modulus (PSI) | 1500% Modulus (PSI) |
|---|---|---|---|---|---|---|---|
| CP-1 | 200 | 954 | 1845 | 16 | 44 | 134 | 391 |
| CP-1 | 300 | 469 | 1973 | 8 | 23 | 74 | 172 |

TABLE 2-continued

Average Mechanical Properties of Oiled Compounds Prepared From the Polymer Hydrogenated In The Presence Of Methanol

| polymer | phr oil | Tensile Strength (PSI) | Elongation (%) | 100% Modulus (PSI) | 500% Modulus (PSI) | 1000% Modulus (PSI) | 1500% Modulus (PSI) |
|---|---|---|---|---|---|---|---|
| CP-1 | 500 | 237 | 2176 | 3 | 9 | 25 | 76 |
| 1 | 200 | 812 | 1788 | 14 | 43 | 132 | 412 |
| 1 | 300 | 424 | 2026 | — | 13 | 55 | 153 |
| 1 | 500 | 190 | 2011 | 2 | 6 | 26 | 98 |

Example 3

Soft gels were made by dissolving 100 parts polymer in 1900 or 1233 parts Drakeol 34, a paraffinic extending oil. C1 refers to the conventional linear, sequential hydrogenated SBS block copolymer used in example 2. Polymer #4 refers to a hydrogenated styrene/butadiene block copolymer composition prepared with a tetraethoxy silane coupling agent, similar to the three polymers listed in Table 1. Samples were mixed with a Silverson Rotor/stator mix head operated at 2,000 rpm for 40 minutes at 170° C. Melt viscosities and Ring and Ball softening points were measured as shown in Table 3.

TABLE 3

Oil Gels with High Molecular Weight Polymers

| Polymer | CP-1 | CP-1 | #4 | #4 |
|---|---|---|---|---|
| Polymer Concentration (%) | 5 | 7.5 | 5 | 7.5 |
| Oil Concentration (%) | 95 | 92.5 | 95 | 92.5 |
| Oil Concentration in PHR | 1900 | 1233 | 1900 | 1233 |
| Irganox 1010 | 0.1 | 0.1 | 0.1 | 0.1 |
| Melt Viscosity @ 300° F. (cps) | 5,950 | 49,700 | 6,100 | 37,700 |
| Melt Viscosity @ 350° F. (cps) | 260 | 1,140 | 600 | 3,000 |
| R&B Softening Point, ° C. | 110 | 124 | 104 | 122 |

Example 4

A polymers of the $(CDE)_n X$ type, where n=1, 2, 3, or 4, was prepared using the coupling technology described in Example 1. Prior to coupling, the polymer was a living triblock copolymer, PBd—PS—PBd—Li. Coupling with tetraethoxysilane gave the highly linked polymer described in Table 4. This polymer was hydrogenated using Ni/Al catalyst to make an E/B-S-E/B-S-E/B, pentablock copolymer. As analyzed by GPC, there was no evidence of decoupling of this polymer during hydrogenation.

TABLE 4

Summary of Molecular Characteristics of Highly Coupled E/B-S-E/B-S-E/B Polymer

| Polymer Number | Dimension Linear Polymer (III) | 1,2-Butadiene Content (%) | Coupling Efficiency (%) | Branched Polymer (%) (I + II) | Linear Polymer (%) (III) | Uncoupled Polymer (%) (IV) | Following Hydrogenation Uncoupled Polymer (%) |
|---|---|---|---|---|---|---|---|
| 5 | 5.0-8.2-57-8.2-5.0 | 77 | 96 | 50 | 46 | 4 | 4 |

A gel was made with this polymer by dissolving 100 parts polymer in 400 parts Drakeol 34. Two other gels were prepared for comparison. The polymer designated CP-2 is very similar to Polymer #5 except it is an S-EB-S sequentially polymerized triblock copolymer of comparable molecular weight and having 40% 1,2-butadiene content. The polymer designated CP-3 is the same as the polymer CP-2 except it has 70% 1,2-butadiene content. The gels were mixed with a Silverson Rotor/stator mix head operated at 2,000 rpm for 40 minutes at 170° C. Melt viscosities and Ring and Ball softening points were measured as shown in Table 5. Results show the high 1,2-butadiene content polymers, CP-3 and #5, give lower melt viscosity than the moderate 1,2-butadiene content polymer, CP-2. Results also show that, comparing the two high 1,2-butadiene content polymers, the pentablock polymer, #5, gives lower softening point than the triblock polymer, CP-3, showing the advantage of having an EB block on both ends of the S block reduces the order/disorder temperature of the polystyrene domains.

TABLE 5

Oil Gels with Low Molecular Weight Polymers

| Polymer | CP-2 | CP-3 | #5 |
|---|---|---|---|
| Polymer Concentration (%) | 20 | 20 | 20 |
| Oil Concentration (%) | 80 | 80 | 80 |
| Oil Concentration (PHR) | 400 | 400 | 400 |
| Irganox 1010 | 0.1 | 0.1 | 0.1 |
| Melt Viscosity @ 300° F. (cps) | 1,055 | 365 | 310 |
| R&B Softening Point, ° C. | 93 | 79 | 71 |

What is claimed is:

1. An oil gel composition comprising 100 parts by weight of at least one hydrogenated block copolymer composition and about 1000 to about 2000 parts by weight of an extending oil, said hydrogenated block copolymer comprising:

a. a linear diblock copolymer (I) having a number average molecular weight of from 25,000 to 200,000 represented by the general formula A-B;

b. a di-branched block copolymer (II) having a number average molecular weight of from 50,000 to 400,000 represented by the general formula (A-B)$_2$X;

c. a tri-branched block copolymer (III) having a number average molecular weight of from 75,000 to 600,000 represented by the general formula (A-B)$_3$X; and d. a tetra-branched block copolymer (IV) having a number average molecular weight of 100,000 to 800,000 represented by the general formula (A-B)$_4$X where:
  i. A represents a polymer block of a mono alkenyl arene;
  ii. B represents a polymer block of a hydrogenated conjugated diene;
  iii. X represents the residue of an alkoxy silane coupling agent having the formula R$_x$—Si—(OR')$_y$, where x is 0 or 1, x+y =4, R and R' are the same or different, R is selected from aryl hydrocarbon radicals, linear alkyl hydrocarbon radicals and branched alkyl hydrocarbon radicals, and R' is selected from linear and branched alkyl hydrocarbon radicals; and
  iv. the relative amounts of copolymers I, II, III and IV are from 2 to 10 weight percent I, from 40 to 95 weight percent II, from 0 to 60 weight percent III, from 0 to 5 weight percent IV, and where the total of I, II, III and IV equals 100 weight percent.

2. The oil gel composition according to claim 1 wherein said mono alkenyl arene is styrene and said conjugated diene is selected from the group consisting of isoprene and butadiene.

3. The oil gel composition according to claim 2 wherein said conjugated diene is butadiene, and wherein prior to hydrogenation about 10 to about 80 mol percent of the condensed butadiene units in block B have 1,2-configuration.

4. The oil gel composition according to claim 2 wherein said conjugated diene is isoprene, and wherein prior to hydrogenation about 5 to about 80 mol percent of the condensed isoprene units in block B have 3,4-configuration.

5. The oil gel composition according to claim 3 wherein said alkoxy silane coupling agent is selected from the group consisting of tetraethoxy silane, tetramethoxy silane, tetrabutoxy silane, methyl trimethoxy silane, methyl triethoxy silane, phenyl trimethoxy silane and isobutyl trimethoxy silane.

6. The oil gel composition according to claim 5 wherein the amount of diblock I is from 4 to 8 percent.

7. The oil gel composition according to claim 3 wherein said A blocks have a number avenge molecular weight of between about 3,000 and about 60,000, and wherein said B blocks have a number average molecular weight of between about 20,000 and about 200,000.

8. The oil gel composition according to claim 7 wherein the weight ratio of polymer block A to polymer block B is from 5/95 to 50/50.

9. The oil gel composition according to claim 8 wherein said extending oil is a paraffinic processing oil.

10. An article prepared from the gel of claim 1.

11. The oil gel composition according to claim 1 also comprising up to 30 percent by weight of a filler, based on the amount of hydrogenated block copolymer.

12. An oil gel composition comprising 100 parts by weight of at least one hydrogenated block copolymer composition and about 1000 to about 2000 parts by weight of an extending oil, said hydrogenated block copolymer comprising:

a. a linear triblock copolymer (I) having a number average molecular weight of from 25,000 to 200,000 represented by the general formula C-D-E;

b. a di-branched block copolymer (II) having a number average molecular weight of from 50,000 to 400,000 represented by the general formula (C-D-E)$_2$X;

c. a tri-branched block copolymer (III) having a number average molecular weight of from 75,000 to 600,000 represented by the general formula (C-D-E)$_3$X; and d. a tetra-branched block copolymer (IV) having a number average molecular weight of 100,000 to 800,000 represented by the general formula (C-D-E)$_4$X where:
  i. C represents a polymer block of a hydrogenated conjugated diene;
  ii. D represents a polymer block of a mono alkenyl arene;
  in. E represents a polymer block of a hydrogenated conjugated diene;
  iv. X represents the residue of an alkoxy silane coupling agent having the formula R—Si—(OR')$_y$, where x is 0 or 1, x+y =4, and R and R' are the same or different, R is selected from aryl hydrocarbon radicals, linear alkyl hydrocarbon radicals and branched alkyl hydrocarbon radicals; and R' is selected from linear and branched alkyl hydrocarbon radicals; and
  iv. the relative amounts of copolymers I, II, III and IV are from 2 to 10 weight percent I, from 40 to 95 weight percent II, from 0 to 60 weight percent III, from 0 to 5 weight percent IV, and where the total of I, II, III and IV equals 100 weight percent.

13. The oil gel composition according to claim 12 wherein said mono alkenyl arene is styrene and said conjugated diene is selected from the group consisting of isoprene and butadiene.

14. The oil gel composition according to claim 13 wherein said conjugated diene is butadiene, and wherein prior to hydrogenation about 10 to about 80 mol percent of the condensed butadiene units in block C and/or block E have 1,2-configuration.

15. The oil gel composition of claim 13 wherein the amount of 1,2 configuration in block C is 5 to 45% and the amount of 1,2 configuration in block E is 25 to 80%.

16. The oil gel composition according to claim 12 wherein said conjugated diene is isoprene, and wherein prior to hydrogenation about 5 to about 80 mol percent of the condensed isoprene units in block C and/or block E have 3,4-configuration.

17. The oil gel composition according to claim 12 wherein said alkoxy silane coupling agent is selected from the group consisting of tetraethoxy silane, tetramethoxy silane, tetrabutoxy silane, methyl trimethoxy silane, methyl triethoxy silane, phenyl trimethoxy silane and isobutyl trimethoxy silane.

18. The oil gel composition according to claim 12 wherein the amount of triblock I is from 4 to 8 percent.

19. The oil gel composition according to claim 12 wherein said C blocks have a number average molecular weight of between about 3,000 and about 25,000, D blocks have a number average molecular weight of between about 3,000 and about 60,000, and wherein said E blocks have a number average molecular weight of between about 20,000 and about 200,000.

20. The oil gel composition according to claim 12 wherein the weight ratio of polymer block D to the sum of polymer blocks C+E is from 5/95 to 50/50.

21. The oil gel composition according to claim 12 wherein said extending oil is paraffinic processing oil.

22. The oil gel composition according to claim 12 also comprising up to 30 percent by weight of a filler, based on the amount of hydrogenated block copolymer.

23. An article prepared from the gel of claim 12.

* * * * *

UNITED STATES PATENT AND TRADEMARK OFFICE
CERTIFICATE OF CORRECTION

PATENT NO. : 7,166,672 B2  Page 1 of 1
APPLICATION NO. : 10/453998
DATED : January 23, 2007
INVENTOR(S) : Dale Lee Handlin, Jr. et al.

It is certified that error appears in the above-identified patent and that said Letters Patent is hereby corrected as shown below:

Col. 9, Line 49 Claim 7, line 2, please delete "avenge" and insert -- average --.

Signed and Sealed this

Fifteenth Day of January, 2008

JON W. DUDAS
*Director of the United States Patent and Trademark Office*